United States Patent [19]
Takehara et al.

[11] 3,922,303
[45] Nov. 25, 1975

[54] PROCESS FOR THE PRODUCTION OF TERTIARY AMINES HAVING HIGHER ALKYL GROUP

[75] Inventors: Kikuo Takehara; Shigeaki Okajima, both of Kyoto; Saburo Komori; Toshio Agawa, both of Osaka, all of Japan

[73] Assignee: Dai-Ichi Kogyo Seiyaku Co., Ltd., Japan

[22] Filed: Dec. 10, 1973

[21] Appl. No.: 423,515

Related U.S. Application Data

[63] Continuation-in-part of Ser. No. 116,275, Feb. 17, 1971, abandoned.

[52] U.S. Cl. ... 260/570.5 R; 260/582 R; 260/584 B; 252/447; 252/454; 252/458; 252/459; 252/460; 252/466 J; 252/466 PR
[51] Int. Cl.² C07C 91/16; C07C 83/00; C07C 91/02
[58] Field of Search ...... 260/583 R, 584 B, 570.5 R

[56] References Cited
UNITED STATES PATENTS
2,160,058   5/1939   Covert ........................... 260/583 R
3,366,687   1/1968   Ellis et al. ....................... 260/583 R

*Primary Examiner*—Paul F. Shaver
*Attorney, Agent, or Firm*—Wenderoth, Lind & Ponack

[57] ABSTRACT

The transalkylation reaction between a hydroxy compound having a higher alkyl group and a tertiary amine having a lower alkyl group to substitute a higher alkyl group for said lower alkyl group of said tertiary amine is carried out in a nitrogen atmosphere and in the presence of a catalyst which is selected from the group consisting of metals of the VIII group in the Periodic Table, alloys containing any of said metals and mixtures thereof.

10 Claims, No Drawings

PROCESS FOR THE PRODUCTION OF TERTIARY AMINES HAVING HIGHER ALKYL GROUP

CROSS REFERENCE TO RELATED APPLICATION

This application is a continuation-in-part of co-pending Application Ser. No. 116,275 filed 17th Feb. 1971, now abandoned, for Method for Carrying Out The Transalkylation Reaction Between Alcohols and Tertiary Amines.

BACKGROUND OF THE INVENTION

This invention relates to an improved process for carrying out the transalkylation reaction between a hydroxy compound and a tertiary amine, and more particularly, to a process for the production of an improved tertiary amine having a higher alkyl group or higher alkyl groups from a starting tertiary amine having a lower alkyl group or lower alkyl groups.

It is known that amines represented by a general formula

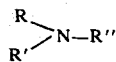

wherein R, R' and R'' are alkyl groups are industrially useful and important as materials for surfactants, anti-corrosives, additives for petroleum asphalt and materials for synthesizing various organic compounds. Amines may be produced by alkylation of ammonia or its derivatives, reduction of various nitrogen compounds or certain other conventional processes. Most of those conventional processed are, however, directed to the production of primary or secondary amines and there are few processes which are directed to the production of tertiary amines. In addition, some conventional processes directed to the production of tertiary amines can only be carried out on an experimental basis and are not of industrially practical use. Further, it was difficult to produce tertiary amines having relatively higher alkyl groups which are preferred for the above mentioned use.

An attempt has been made to obtain tertiary amines having relatively higher alkyl groups through the utilization of the transalkylation between higher alcohols and tertiary amines having lower alkyl groups. For example Adkins et al. disclosed in J. Am. Chem. Soc. vol. 74, pp 4287, 1952 a transalkylation reaction between alcohols and tertiary amines was carried out at 250°C under hydrogen at a pressure of 400 atmospheres in the presence of a catalyst of copper-chromium-barium oxide.

Komori and Agawa who are two of the co-inventors of the present invention proposed in Japanese Pat. No. 23,264 filed 19th Apr. 1965 (Japanese Pat. No. 38,803 of 1970) to carry out the transalkylation reaction between alcohols and tertiary amines at 350°C and under hydrogen at a pressure of 15 atmospheres in the presence of a catalyst of copper metal. It was reported that the rate of conversion from alkyl group of alcohol to amine was about 70%. Further, with the use of another copper-containing catalyst, they proposed a continuous transalkylation reaction between certain alcohols and amines at 250° to 350°C and under normal atmospheric or reduced pressure, attaining about 70 to 80% conversion.

The above mentioned conventional processes for the transalkylation reaction between alcohols and tertiary amines, involve the following disadvantages:

a. Those conventional processes require either an initial hydrogen pressure of the order of 15–20 kg/cm$^2$ or even in the case of reaction under atmospheric pressure, they require hydrogen for the activation of the catalyst and/or as a carrier gas for the reactants. Pressurizing such hydrogen gas or keeping it flowing through the reaction system entails great danger;

b. The transalkylation reaction between an alcohol and a tertiary amine produces a mixture of three types of tertiary amines which have one, two and three alkyl groups exchanged, and there is no selectivity in obtaining these three types of amines; and c. The catalysts of the type used tend to become inert due to sintering and have a relatively short life, since the catalysts are based on copper which has a relatively low melting point.

The primary object of the invention is to provide an improved process for the production of tertiary amines having higher alkyl groups from economically available raw tertiary amines having lower alkyl groups.

Another object of the invention is to provide a new and improved process for the transalkylation reaction between hydroxy compounds and tertiary amines in which the reaction can be carried out without using hydrogen gas but under an atmosphere of nitrogen.

A further object of the invention is to provide a new and improved process for carrying out the transalkylation reaction between hydroxy compounds and tertiary amines in which the alkyl groups of the tertiary amine can be selectively exchanged with the alkyl group of the alcohol or the residue of the hydroxy compound with the result that the exchange of any of the alkyl groups of the tertiary amine with the alkyl group of the alcohol can be carried out as desired at high yields.

A still further object of the invention is to provide new and improved catalysts for the transalkylation reaction between hydroxy compounds and tertiary amines, which have relatively high melting points so as to be effective even at a relatively high temperature and are of long life.

Other objects of the invention will become apparent from the following detailed description of the invention.

SUMMARY OF THE INVENTION

The process for the production of a tertiary amine having a higher alkyl group or higher alkyl groups according to the invention comprises carrying out a substitution reaction between a high molecular hydroxy compound and a starting raw tertiary amine, at least one of the alkyl groups of which is a lower alkyl group having 1 to 5 carbon atoms, in an atmosphere consisting essentially of nitrogen and in the presence of a particularly selected catalyst.

The high molecular hydroxy compounds used in the present invention are higher alcohols such as primary or secondary alcohols containing 8 to 30 carbon atoms or alkyl phenols.

The tertiary amines used in the present invention contain three alkyl groups having 1 to 30 carbon atoms. Those three alkyl groups may be either the same or different from each other.

The catalyst used in the present invention is a member selected from the group consisting of metals of the VIII group in the Periodic Table, alloys containing any of said metals and mixtures thereof.

DETAILED DESCRIPTION OF THE INVENTION

The reaction according to the invention may be represented by the following equation:

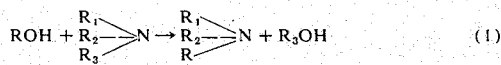     (1)

wherein R is alcohol residue and $R_1$, $R_2$ and $R_3$ are the alkyl groups of the reactant tertiary amine.

The product

may be used as the reactant material tertiary amine to effect the reaction:

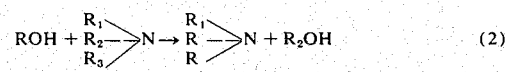     (2)

and further,

may be used as the reactant material amine to effect the reaction:

     (3)

In the equation (1), the starting tertiary amine contains three lower alkyl groups $R_1$, $R_2$ and $R_3$. A high molecular, long chain alkyl group R of the reactant alcohol is substituted for the lower alkyl group $R_3$ of the starting tertiary amine. The other lower alkyl groups $R_2$ and $R_1$ of the starting tertiary amine may then be successively replaced by the higher alkyl group as indicated in the equations (2) and (3). In this manner industrially useful tertiary amines having a higher alkyl group or higher alkyl groups can be produced from economically available raw tertiary amines having lower alkyl groups.

It should be noted that according to the invention the reaction indicated in each of the above equations (1), (2) and (3) is not reversible.

It should also be noted that R in each of the above equations may be a residue of an ethylene oxide adduct of an alkylene phenol.

Among the higher alcohols used in the present invention are primary and secondary alcohols containing C8—30 straight-chain-or side-chain-containing alkyl groups, unsaturated bond-containing alkyl groups, and ether bonds such as polyoxyalkylene alkyl ether and polyoxyalkylene alkyl phenyl ether. It is also possible to use those alcohols having aromatic rings at the position of β and subsequent sites of the alkyl group, but phenols do not react.

The above alcohol compounds may be shown in their structural formulas as follows:

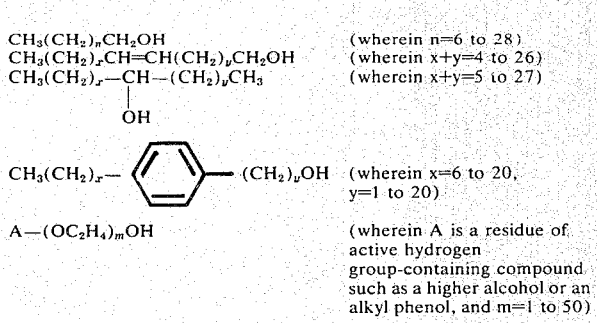

Those having two or more of side-chain-containing isomers and unsaturated bonds are also useful. Among these alcohols are, for example, octanol-1, dodecanol-1, stearyl alcohol, oleyl alcohol, octanol-2, dodecanol-2, pentadecanol-8, 2-ethyl hexanol-1, octyl benzyl alcohol, dodecyl benzyl alcohol, 3-mol ethylene oxide adduct of octanol, 15-mol ethylene oxide adduct of dodecyl alcohol, 10-mol ethylene oxide adduct of nonylphenol, 30-mol ethylene oxide adduct of dodecylphenol, and 25-mol ethylene oxide adduct of heptadecyl alcohol-9.

The starting tertiary amines used in the present invention contain three alkyl groups having 1 to 30 carbon atoms. At least one of the alkyl groups is a lower alkyl group having 1 to 5 carbon atoms. The three alkyl groups may be either the same or different form each other.

Among these tertiary amines there are, for example, trimethyl amine, triethyl amine, tripropyl amine and N,N-diisopropyl methyl amine.

The number of carbon atoms of the alkyl group of the reactant material alcohol should be greater than the number of carbon atoms of any alkyl group or groups to be exchanged of the reactant material tertiary amine. If the number of carbon atoms of the alkyl group of the reactant material alcohol is the same as or smaller than the number of carbon atoms of each of the alkyl groups of the reactant material tertiary amine, little or no reaction will occur. If the three alkyl groups of the reactant material tertiary amine have different numbers of carbon atoms, the alkyl group $R_3$ of the reactant tertiary amine having the smallest number of carbon atoms will first be exchanged with the alcohol residue R of the reactant alcohol as indicated in the above formula (1). The alkyl group having the second smallest number of carbon atoms will then be exchanged and finally the alkyl group having the largest number of the carbon atoms will be exchanged, as shown in the above formulas (2) and (3), respectively.

The method according to the invention finds it greatest usefulness in obtaining higher alkyl group-containing tertiary amines by causing higher alkyl group-containing alcohol to react with lower alkyl group-containing tertiary amines. The method according to the invention is also useful to selectively obtain various useful tertiary amines in high yields by selection of the type of the alkyl groups contained in the reactant material tertiary amines, the lengths of the chains of those alkyl groups, and the type of the alkyl group contained in the reactant material alcohol.

The molar ratio of the reactant material tertiary amine to the reactant material alcohol should be within the range of 3:1 to 6:1, the optimum molar ratio being about 5:1. With a ratio of less than 3:1 dehydration of alcohols would occur to produce olefines and the raw material tertiary amines would also decompose into primary and secondary amines and olefines.

The catalyst used in the method according to the invention is selected from any of the following groups:
1. Metals of the VIII group of the Periodic Table;
2. Alloys comprising a combination of two or more of metals of the VIII group in the Periodic Table;
3. Alloys including at least one metal of the VIII group in the Periodic Table and further including a metal or metals in any other group than the VIII group; and
4. Mixtures thereof.

The catalyst may be used either in the form of metal powder or in the form of being supported on a carrier.

The metals of the above mentioned group (1) comprises Fe, Co, Ni, Ru, Rh, Pd, Os, Ir and Pt.

Examples of alloys of the group (2) are Co—Fe, Ni—Pd, Ni—Pt, Ni—Fe, Co—Ir, Co—Pd and Co—Rh in any desired alloying proportions. Particularly alloys having face centered cubic lattices are effective and preferred.

Examples of metals of other groups contained in the alloys of the group (3) are Cr, Mn, W, Mo, Cu, Cd, Zn, Au and Ag, and examples of such alloys are Ni—Cr, Co—Cr, Cu—Ni, Cu—Pt, Ag—Pd and Au—Ni. In these alloys, the content of the metal of the VIII group of the Periodic Table is preferably 20% or more by weight.

The catalyst described may be used either in the form of metal powder or in the form of being supported on a carrier material. In the case where the reaction is carried out in a batch system, the catalyst may be supported on powders having large surface areas such as alumina, silica, active carbon and celite (diatomaceous earth). In case where the reaction is carried out in a continuous system under ordinary pressure, the catalyst may be supported on the surfaces of pellets of said various carrier materials or it may be used in the form of a pellet which is shaped of powder carrier material supporting the catalyst thereon.

In the case where the reaction is carried out in a batch system, the amount of the effective component of the catalyst is preferably 2% or more by weight of the amount of the reactant material alcohol. The effective component means a metal or metals of the VIII group in the Periodic Table. With less than 2%, the yields will be reduced, which is undesirable. However, if the exposed area of the effective component of the catalyst can be increased, for example, by using the metal element in a finely divided form, by alloying the effective component with any other metal element, or by supporting the catalyst by a carrier material, even 1% or thereabout may bring about a good yield, but with amounts of less than 1% it is impossible to expect good yields.

According to the invention the transalkylation reaction can be carried out at temperatures within the range of 150° to 350°C, more preferably, within the range of 200° to 300°C. Within this range of temperature, some of the reactant material tertiary amines may be heated above their boiling points with the reaction chamber being brought into a pressurized condition. With reaction temperatures below 150°C, the transalkylation reaction will hardly proceed and accordingly, it takes a long time before the transalkylation reaction product is produced in a desired amount. With reaction temperatures above 350°C dehydration of alcohol and separation of the alkyl groups of tertiary amine will occur to produce olefins, so that the reaction yield is very poor.

The substitution reaction according to the invention is carried out in a nitrogen atmosphere or in a nitrogen flow. There is no need to use an initial hydrogen pressure as required in the conventional methods. The reaction may preferably be carried out under pressures within the range of 0 to 15 atmospheres of nitrogen. By no means does the method according to the invention require such a high pressure condition as the 60 to 70 atmospheres which have been required for the conventional methods. The reaction according to the invention may be carried out in a continuous system through the utilization of an elongated reaction column into which pellets of catalyst are charged. In this continuous system, the reactants may be introduced by a carrier gas of nitrogen and the reaction can be carried out under ordinary pressure.

The residue of any of the before-mentioned high molecular hydroxy compounds can be substituted for a lower alkyl group of a starting tertiary amine by carrying out the transalkylation reaction therebetween in a hydrogen atmosphere. However, in the case where transalkylation reaction is carried out in a hydrogen atmosphere, any unsaturated residue of the hydroxy compound is saturated before substitution. If the high molecular hydroxy compound is an ethylene oxide adduct, the ethylene oxide adduct is decomposed since each of the ether bonds is destroyed. To the contrary, according to the invention, any unsaturated residue or long chain ethylene oxide adduct can be substituted as it is without causing saturation or decomposition for a lower alkyl group of the starting tertiary amine because the reaction according to the invention is carried out not in a hydrogen atmosphere but in a nitrogen atmosphere.

In the case where the reaction is carried out in a batch system, a reaction period of 2 to 3 hours will provide transalkylation of above 90% from the alkyl group of alcohol to any of the alkyl groups of tertiary amine. In the case of continuous system as mentioned in the above, the operation for the reaction may be carried out at a reactant flow rate of 20g/hr with respect to a catalyst layer volume of 100cc with the result of transalkylation of above 80%.

It has been found that if the catalyst is used in the form of an alloy, whether it is an alloy or two or more different metals of the VIII group in the Periodic Table or an alloy of a metal of the VIII group in the Periodic Table with another metal of any other group the difference in adsorption on the surface of the catalyst between the raw material alcohol and the raw material tertiary amine become smaller and the catalyst can absorb as much alcohol as tertiary amine, with the result that the reaction yield and the conversion rate are thereby further improved.

It has also been found that if a high melting point metal such as chromium, manganese or tungsten which, when used alone, shows no catalysis effect in the reaction described, is utilized as a component of the alloy catalyst according to the invention, it can unexpectedly enhance the catalysis effect through the prevention of sintering and by further activation of catalyst.

Further, it has been found that while with the use of a conventional copper-chromium-barium oxide catalyst, the reaction yield is reduced to half after it is used five times in a batch system, with the use of the catalyst according to the invention, even after it is used 5 to 10 times, no reduction of the reaction yield is seen.

The product tertiary amines obtained by the present invention find a variety of applications including their use as raw materials for surface active agents, additives to rust inhibitor, petroleum and asphalt, and raw materials for synthesis.

DESCRIPTION OF THE PREFERRED EMBODIMENTS

For the better and complete understanding of this invention, typical examples thereof are shown in the following:

EXAMPLE 1

A 1-liter magnetically stirred autoclave was charged with 100g of dodecyl alcohol, 272g of treithyl amine and 5g of powder (200 mesh) of Ni-Cr alloy (50%–50% in weight) for use as catalyst and with the gases in the upper space of the autoclave replaced by nitrogen. The reaction was then allowed to proceed at 250°C for 3 hours. The pressure during reaction was 15 atmospheres, and it returned to ordinary pressure after being allowed to cool upon completion of the reaction. The reaction product was taken out to filter out the catalyst and remove the triethyl amine and by-product ethanol. The reaction product was in the form of a colorless transparent oily substance, weighing 127g. It was analyzed by gas chromatography and found that the product contains 96% of dodecyl diethyl amine, 3% of unreacted dodecyl alcohol and 1% of didodecyl ethyl amine. It was observed that a tertiary amine of a high purity which scarcely includes any primary or secondary amines is obtained at a good yield.

EXAMPLES 2 – 7

Reactions were carried out by using various catalysts and reaction temperatures in the same manner as in Example 1. The results are shown in Table 1.

Table 1

| Example Number | Catalyst | Amount of catalyst used | Reaction temp. | Reaction product composition % | | |
|---|---|---|---|---|---|---|
| | | | | Dodecyl diethyl amine | Didodecyl ethyl amine | Unreacted dodecyl alcohol |
| 2 | Ni-Co-alumina | 5g | 200°C | 89 | 7 | 4 |
| 3 | Fe-Ni-alumina | 5g | 280°C | 86 | 7 | 7 |
| 4 | Co-alumina | 3g | 200°C | 70 | 5 | 25 |
| 5 | Fe-active carbon | 10g | 300°C | 60 | 15 | 25 |
| 6 | Ni-metal powder | 2g | 250°C | 78 | 5 | 17 |
| 7 | Ru-metal powder | 2g | 250°C | 65 | 8 | 27 |

In the above table, the catalyst used in Example 2 comprises Ni-Co alloy (70:30 in weight) and a carrier of alumina, the composition ratio of alloy to carrier being 20:80 in weight. The catalyst used in Example 3 comprises Fe—Ni- alloy (20:80 in weight) and a carrier of alumina, the composition ratio of alloy to carrier being 20:80. The catalyst used in Example 4 comprises metal element Co and a carrier of alumina, the composition ratio of Co to alumina being 50:50 in weight. The catalyst used in Example 5 comprises metal element Fe and a carrier of active carbon, the composition ratio of Fe to active carbon being 75:25.

From Table 1 it will be observed that each of catalysts used in Examples 2 to 7 has a good catalytic function enough to industrially practical use, though there are seen some differences in the composition of the product depending on the catalysts used. It was also found that in any of the Examples 2 to 7 it is possible to reuse the catalyst.

EXAMPLES 8 TO 14

Reactions were carried out by using as the various reactants alcohols and tertiary amines having different alkyl groups, respectively. The results thereby are shown in Table 2. The molar ratio of the starting material alcohol to the starting material tertiary amine in each of the examples was 1:3. The catalyst used was a composition comprising Co—Ni alloy (70:30 in weight) and alumina carrier, the composition ratio of alloy to carrier being 20:80. The reaction lasted for three hours.

Table 2

| Example Number | Alcohol | Tertiary amine | Reaction temp. | Reaction product composition (%) | | |
|---|---|---|---|---|---|---|
| | | | | One alkyl group exchanged | two alkyl groups exchanged | Unreacted alcohol |
| 8 | $CH_3(CH_2)_3CHCH_2OH$ with branch $CH_3CH_2$ | Triethyl amine | 300 | 79 | 0 | 21 |
| 9 | $C_9H_{19}$—⟨phenyl⟩—$(OC_2H_4)_{10}OH$ | " | 270 | 82 | 9 | 9 |
| 10 | $C_8H_{17}\!>\!CH$—$(OC_2H_4)_3OH$ with $C_8H_{17}$ | " | 270 | 84 | 11 | 5 |
| 11 | $C_{12}H_{25}OH$ | Tripropyl amine | 250 | 88 | 4 | 8 |
| 12 | " | Tributyl amine | 250 | 87 | 3 | 10 |
| 13 | " | Diisopropyl methylamine | 250 | 75 | 24 | 1 |
| 14 | $C_{18}H_{35}OH$ | Triethyl amine | 270 | 78 | 12 | 10 |

From Table 2 it will be understood that the process according to the invention can be carried out with good results when the number of carbon atoms of the alkyl group of the reactant material alcohol is greater than the number of carbon atoms of any alkyl group or groups to be exchanged of the reactant material tertiary amine.

EXAMPLE 15

A quartz tube having an inner diameter of 20 mm and a length of 1000 mm was charged with 100cc of Co—Ni-Alumina catalyst pellets. The catalyst comprised Co—Ni-alloy (70:30 in weight) and a carrier of alumina, the composition ratio of alloy to carrier being 50:50 in weight, and was shaped in the form of a pellet having a diameter of 5mm and a length of 4mm. In the place nearer to the inlet 50cc of Raschig ring with a diameter of 5mm was put for preheating. While nitrogen gas is being passed through the tube, the temperature was heated to 250°C. An automatic injection pump was used to introduce a 1:3 mixture of dodecyl alcohol and triethyl amine to the tube through the inlet at one end thereof at the rate of 30g/hr. The reaction product leaving the reaction tube at the other end was trapped in a cooler. The reaction product was distilled to remove the triethylamine and ethanol.

The remaining oily substance was analyzed by gas chromatography and found to contain 85% of dodecyl diethyl amine and 15% of unreacted dodecyl alcohol.

It was confirmed by this example that process according to the invention can be carried out effectively in a continuous system.

EXAMPLE 16

Octyldiethyl amine and dodecyl alcohol were charged in a molar ratio of 3:1 into an autoclave and Ru powder was used as catalyst in an amount of 5% in weight on the basis of the raw material alcohol. The reaction lasted for three hours at 300°C. The reaction product was subjected to quantitative analysis by gas chromatography. As a result, the presence of unreacted dodecyl alcohol in an amount of 15% on the basis of the raw material alcohol was detected along with the presence of by-product octanol in an amount of 2% on the basis of the raw material amine. Octyldodecylethyl amine resulting from the exchange between an ethyl group of the octyldiethyl amine and dodecyl group of the dodecyl alcohol was obtained in an 83% yield.

By this example it was verified that according to the invention the short chain alkyl group of a starting tertiary amine can be preferentially and quantitatively exchanged with a long chain alkyl group.

What we claim is:

1. A process for the production of a tertiary amine having a higher alkyl group or higher alkyl groups which comprises carrying out a substitution reaction between a primary or secondary alcohol selected from the group consisting of 1) $CH_3(CH_2)_nCH_2OH$    wherein n=6 to 28
2) $CH_3(CH_2)_xCH=CH(CH_2)_yCH_2OH$    wherein x+y=4 to 26
3) $CH_3(CH_2)_x-\underset{\underset{OH}{|}}{CH}-(CH_2)_yCH_3$    wherein x+y=5 to 27

4) 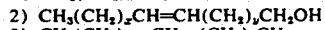 wherein x=6 to 20, y=1 to 20 and

5) $A-(OC_2H_4)_mOH$    wherein A is a residue of an active hydrogen group-containing compound and m=1 to 50 and a starting tertiary amine, said starting tertiary amine being a trialkylamine having three alkyl groups, each alkyl group having 1 to 30 carbon atoms, at least one of said alkyl groups being a lower alkyl group having 1 to 5 carbon atoms, in an atmosphere consisting essentially of nitrogen and in the presence of a catalyst selected from:
   a. Fe, Co, Ni and Ru,
   b. Alloys consisting of a combination of two or more members selected from the group consisting of Fe, Co, Ni and Ru,
   c. Alloys of at least one member selected from the group consisting of Fe, Co, Ni and Ru, and at least one metal selected from the group consisting of Cr, Mn, W, Mo, Cu, Cd, Zn, Au and Ag, or
   d. Mixtures of members selected from the group consisting of Fe, Co, Ni and Ru.

2. A process according to claim 1, wherein said starting tertiary amine is a trialkylamine selected from the group consisting of trimethylamine, triethylamine, tripropylamine and N,N-diisopropyl methyl amine.

3. A method as defined in claim 1, wherein said catalyst is supported on alumina, silica, active carbon or celite.

4. A method as defined in claim 1, wherein said catalyst is an alloy of (b).

5. A method as defined in claim 1, wherein said catalyst is an alloy comprising at least 20 weight % of at least one of the metals of (a).

6. A method as defined in claim 1, wherein said catalyst is used in an amount of at least one % in weight of the reactant material alcohol when the reaction is carried out in a batch system.

7. A method as defined in claim 1, wherein the number of carbon atoms of the alkyl group of the reactant material alcohol is greater than the number of carbon atoms of said lower alkyl group of the said starting tertiary amine.

8. A method as defined in claim 1, wherein the molar ratio of the starting tertiary amine to the reactant hydroxy compound is within the range of 3:1 to 6:1.

9. A method as defined in claim 1 wherein said reaction is carried out at a temperature within the range of 150° to 350°C.

10. A method as defined in claim 1 wherein said reaction is carried out at a temperature within the range of 200° to 300°C.

\* \* \* \* \*